United States Patent [19]

Flament

[11] Patent Number: 4,941,784
[45] Date of Patent: Jul. 17, 1990

[54] DEVICE FOR STABILIZING OBJECTS WITHIN THE TRUNK OF A VEHICLE

[76] Inventor: Daniel Flament, 54 Avenue de Verdun, Croissy sur Seine, France, 78290

[21] Appl. No.: 302,232
[22] PCT Filed: Jun. 26, 1987
[86] PCT No.: PCT/FR87/00250
§ 371 Date: Dec. 30, 1988
§ 102(e) Date: Dec. 30, 1988
[87] PCT Pub. No.: WO88/00144
PCT Pub. Date: Jan. 14, 1988

[30] Foreign Application Priority Data

Jul. 9, 1986 [FR] France ................ 86 09967
Dec. 26, 1986 [FR] France ................ 86 18200

[51] Int. Cl.$^5$ ............................................. B61B 45/00
[52] U.S. Cl. ..................................... 410/121; 211/184
[58] Field of Search ............ 410/101, 120, 121, 11, 410/30, 4, 71, 72, 73; 211/184, 13, 71

[56] References Cited

U.S. PATENT DOCUMENTS 3,027,017 3/1962 Luxeder .
4,027,892 6/1977 Parks .

FOREIGN PATENT DOCUMENTS

0006604 1/1980 European Pat. Off. .
7043906 3/1971 Fed. Rep. of Germany .
2344938 4/1975 Fed. Rep. of Germany .
2538394 8/1975 Fed. Rep. of Germany .

Primary Examiner—Andres Kashnikow
Assistant Examiner—Virna Lissi Mojica
Attorney, Agent, or Firm—Young & Thompson

[57] ABSTRACT

A device for stabilizing objects within the trunk of a vehicle, in particular of an automobile, comprises a plate (100) which is intended to be placed on the floor of the trunk, the plate (100) being provided with uniformly spaced holes (101) and a series of pegs which are intended to be inserted vertically in the holes for clamping the objects. The plate (100) is provided with cavities (102) molded in this latter and shaped so as to receive unused pegs in the flat position.

12 Claims, 7 Drawing Sheets

FIG_4   FIG_5

FIG_10

FIG_11

FIG_12

DEVICE FOR STABILIZING OBJECTS WITHIN THE TRUNK OF A VEHICLE

The present invention relates to a device for stabilizing objects within the trunk of a vehicle, in particular of an automobile.

It is known that a motorist is often faced with the need to transport in the empty or partly empty trunk of his automobile objects of small size which are liable to move about within the trunk if they are not perfectly secured against the side walls of the trunk.

In the case of fragile objects or of objects which are liable to upset and to spill a liquid on the floor of the trunk, such stabilization is indispensable. In order to achieve such stabilization, the motorist has recourse to all kinds of means such as string, extensible straps, cardboard boxes, etc, which are tedious to use and are often ineffective.

In accordance with U.S. Pat. No. 4,027,892, a device is known for stabilizing objects within the loading surface of a vehicle, which comprises a plate provided with holes having the intended function of receiving nipples formed on small plates for supporting one or a number of vertical members which are intended to stabilize objects placed on said plate.

The disadvantage of this device lies in the fact that the aforesaid elements with nipples are cumbersome and therefore difficult to store within the trunk of a car.

The object of the present invention is to provide a remedy for these disadvantages by producing a stabilization device which is simple to use, which is effective, and which does not obstruct the interior of the trunk.

In accordance with the invention, the device for stabilizing objects within the trunk of a vehicle, in particular of an automobile, comprising a plate which is intended to be placed on the floor of the trunk, said plate being provided with uniformly spaced holes and a series of members which are intended to be inserted vertically in the holes for stabilizing the objects, is characterized in that said members are pegs and that the plate is provided with cavities molded in this latter and shaped so as to receive unused pegs in the horizontal position.

In order to stabilize objects, it is only necessary to insert a number of pegs in the plate around the objects. An operation of this type is very simple to perform.

Moreover, a plate of this type does not obstruct the interior of the trunk.

Furthermore, the cavities formed in the plate serve to store pegs which are not in use so that the presence of these latter does not interfere with the positioning of objects on the plate. Moreover, in view of the fact that the unused pegs are well set in the cavities molded in the plate, these pegs are not liable to move when the vehicle is traveling.

The plate can be of molded plastic material whilst the pegs can be of light metal alloy or also of plastic material.

In an advantageous embodiment of the invention, each hole is formed in a sleeve extending from that surface of the plate which is intended to receive the objects to be clamped.

These sleeves permit sufficient resistance of the pegs to lateral forces.

Preferably, the length of the sleeves is such that when the plate is placed on the lining of the floor of the trunk, the sleeves are in contact with said lining.

The edges of said sleeves prevent any sliding of the plate on the lining of the trunk and thus avoid the use of any complementary means for fixing the plate on the floor of the trunk.

Preferably, the plate has hollowed-out portions bordered by two pairs of orthogonal grooves, the distance between two hollowed-out portions being adapted to the length of the pegs.

Thus, when the pegs are housed in a flat position within the grooves of the plate, the opposite ends of said pegs are located opposite to the hollowed-out portions. By means of these latter, the user can readily withdraw the pegs from their embedded position in the plate by inserting a finger between one of the ends of a peg and the corresponding hollowed-out portion of the plate.

Other particular features and advantages of the invention will become further apparent from the description given hereinafter.

In the accompanying drawings which are given by way of non-limitative example.

Figure 1:
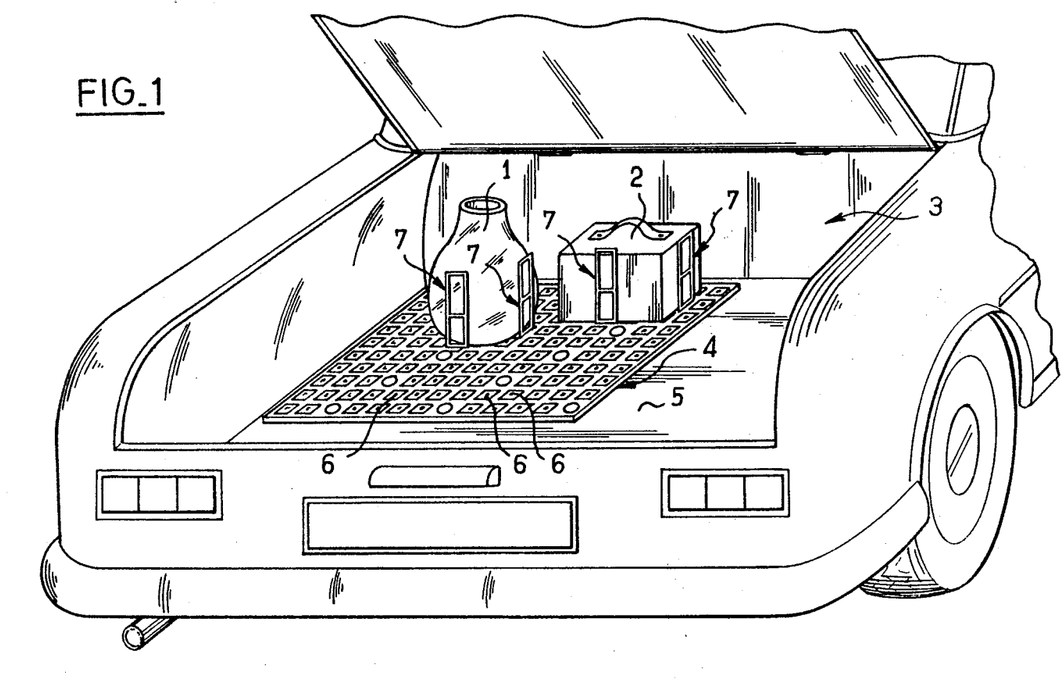
FIG. 1 is a view in perspective of the open trunk of an automobile, a stabilization device in accordance with the invention being placed on the floor of said trunk.

With reference to FIG. 1, the device for stabilizing objects 1, 2 within the trunk 3 of an automobile comprises a plate 4 placed on the floor 5 of the trunk 3, said plate 4 being provided with uniformly spaced holes 6, and a series of pegs 7 inserted vertically in the holes 6 for clamping the objects 1, 2.

The plate is preferably of injection-molded thermoplastic material.

The pegs 7 are preferably of plastic material or of light metal alloy such as Alpax or Duralumin.

The plate 4 is provided (see FIG. 2) on that surface which is intended to receive the objects to be stabilized with a series of uniformly spaced square elementary surfaces 8 separated by a series of rectilinear and orthogonal grooves 9, 10 (see FIG. 4), a certain number of these square elementary surfaces (one out of two in the example shown) being provided with a hole 6 for attachment of a peg 7. The distribution of these holes 6 is such that the holes aligned in a row are in staggered relation to the holes of the adjacent rows.

Each hole 6 is formed (see FIG. 4) in a sleeve 11 extending from the corresponding square elementary surface 8 in a direction opposite to the surface of the plate 4 which is intended to receive the objects to be clamped.

Figures 4, 5:
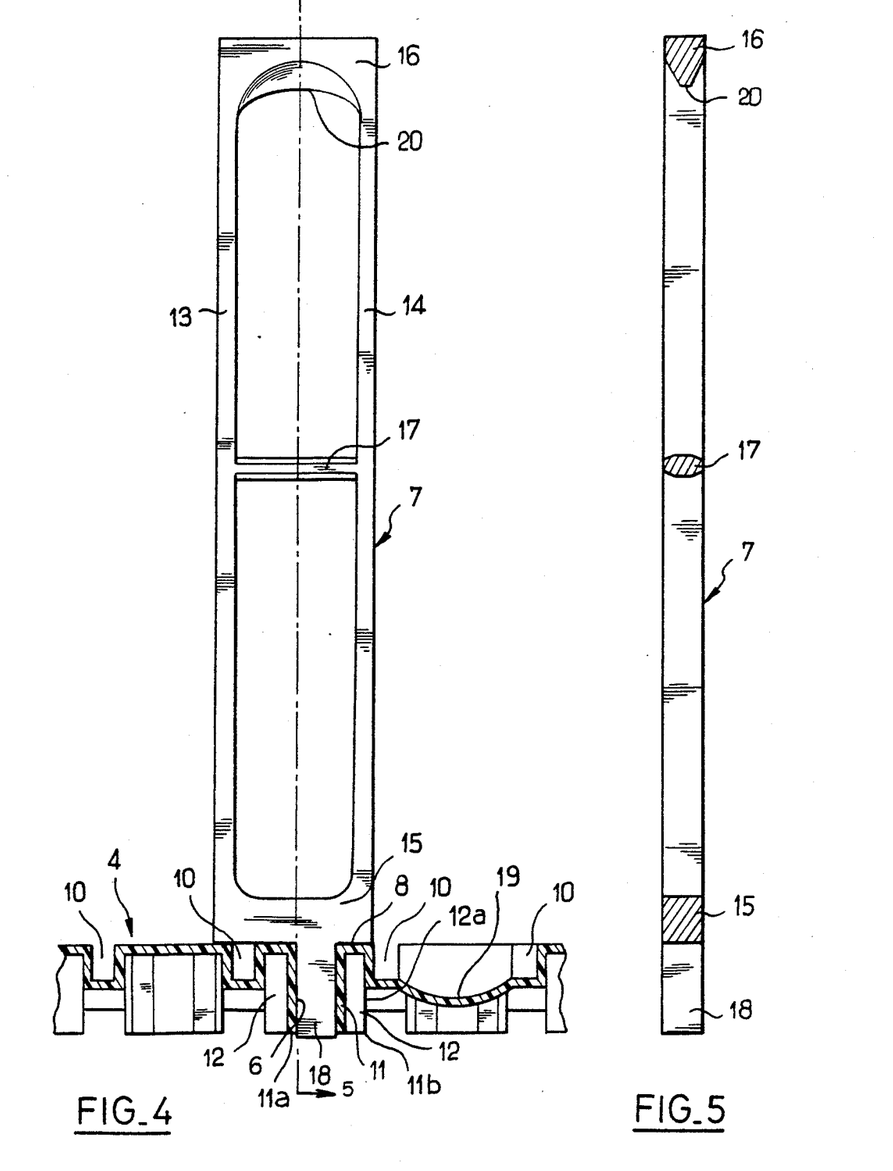
FIG. 4 is a view in cross-section along the plane IV—IV of FIG. 2, showing in addition a peg inserted in a hole of the plate.
FIG. 5 is a view in cross-section along the plane V—V of FIG. 4, FIGS. 6 to 8 are schematic views showing the different possible positions for a peg (shown partially) and an object stabilized by this latter.

As also shown in FIG. 4, the length of the sleeves 11 is greater than the depth of the grooves 10 of the plate 4, with the result that the edges 11a of the sleeves 11 come into contact with the floor 5 of the trunk.

Figure 3:
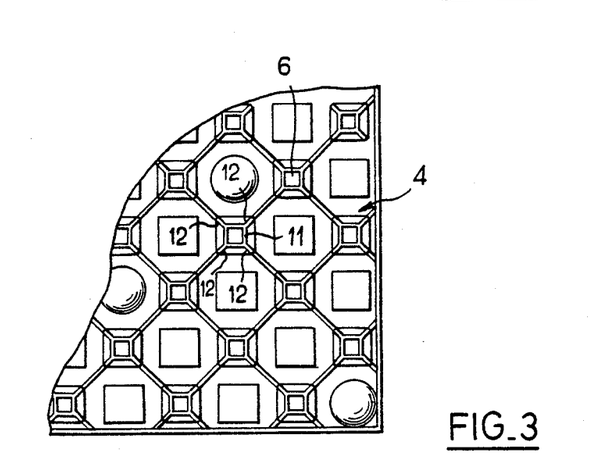
FIG. 3 is a view which is similar to FIG. 2, showing the surface which is intended to be in contact with the floor of the trunk.

The sleeves 11 are provided (see FIGS. 3 and 4) with radial lateral fins 12 whose edges 11a remote from the surface of the plate 4 which is intended to receive the objects to be clamped are located in the same plane, these edges 11a being joined by means of a sharp arris 11b to the corresponding lateral edges 12a of the fins 12.

Figure 9:
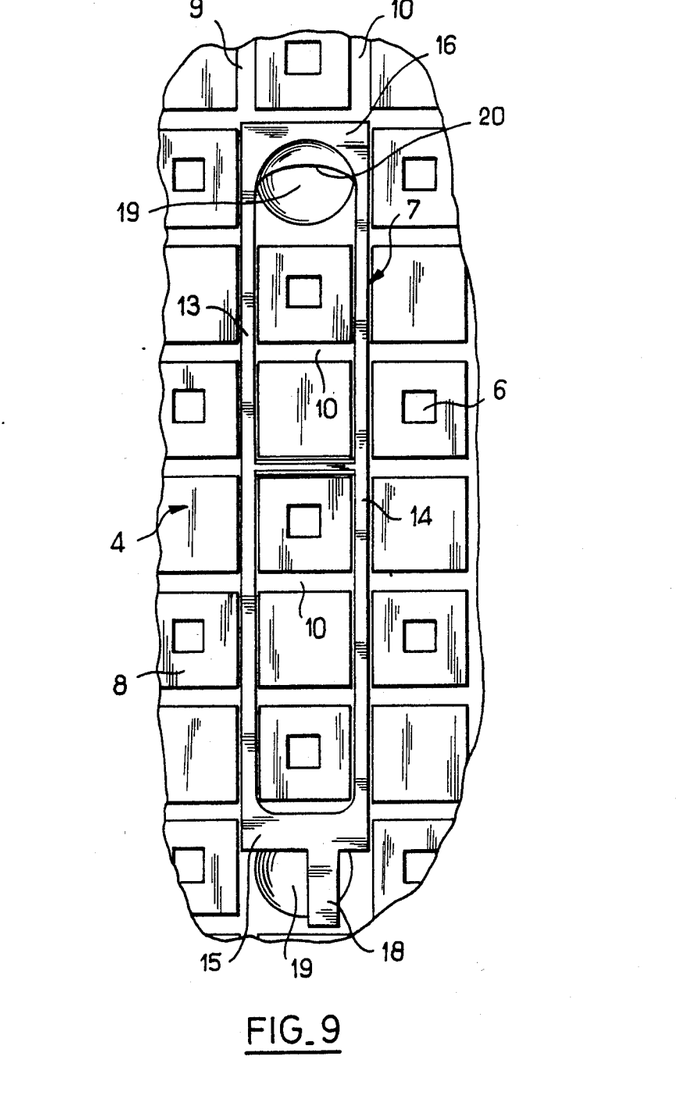
FIG. 9 is a partial plan view of a plate, showing a peg embedded in the surface of said plate.

As can be seen in FIG. 9, the pegs 7 are so shaped as to be capable of fitting in a flat position within the grooves 9, 10 of the plate 4.

Each peg 7 (see FIGS. 4, 5, 9) has two parallel arms 13, 14 which are joined at their opposite ends by means of distance-pieces 15, 16, a third distance-piece 17 being provided at the mid-height of the peg. The cross-section of the arms 13, 14 and of the distance-piece 17 is substantially equal to that of the grooves 9, 10 of the plate.

The distance-piece 15 carries a lug 18 which is intended to be engaged in a hole 6 of the plate 4.

Figure 2:
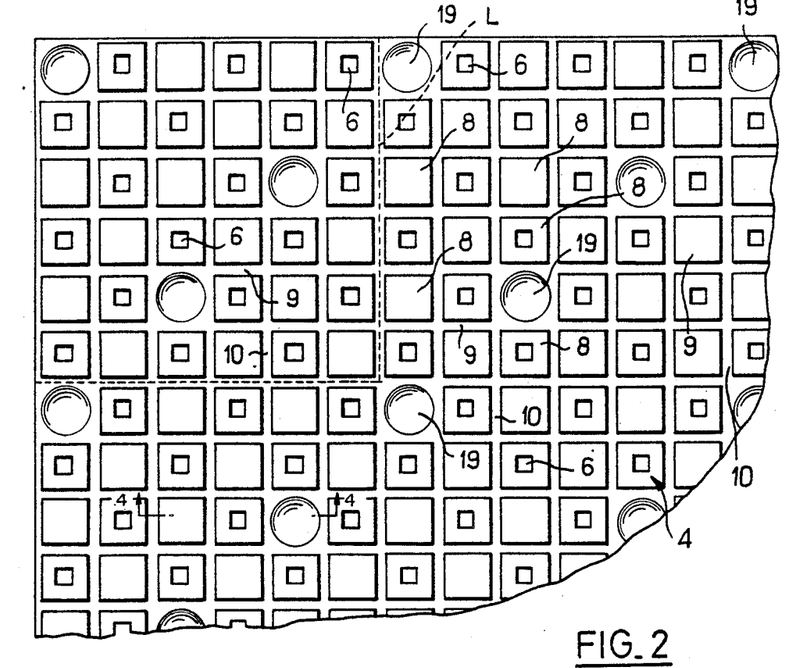
FIG. 2 is a partial plan view of the plate of the device in accordance with the invention, showing the surface which is intended to receive the objects to be stabilized.

It is apparent from FIGS. 2 and 4 that the plate 4 is provided in the alignment of certain rows (one out of two in the example shown) of square elementary surfaces 8 with hollowed-out portions 19 having the shape of a portion of sphere and surrounded by two pairs of orthogonal grooves 9, 10.

The distance between two hollowed-out portions 19 of one and the same row is adapted to the length of the pegs 7. Thus the end distance-pieces 15, 16 are located opposite to two hollowed-out portions 19 and thus make it possible to accommodate these distance-pieces 15, 16. Moreover, as indicated in FIGS. 4 and 5, the face 20 of the end distance-piece 16 which is directed towards the interior of the peg 7 is chamfered, thus enabling the user to engage a finger between the distance-piece 16 and the corresponding hollowed-out portion 19 in order to release the peg 7 from its housing in the plate 4.

By virtue of this arrangement, the distance between the hollowed-out portions 19 in the direction of the grooves 10 is equal to the distance between the hollowed-out portions 19 in the direction of the grooves 9. The user can thus insert the pegs 7 in either of these two directions.

It can be seen in addition in FIG. 2 that the hollowed-out portions 19 are aligned in parallel directions forming an angle of 45° with the grooves 9 of the plate 4. Moreover, the square pattern surrounded by the dashed line L in FIG. 2 is repeated several times on the plate 4.

The holes 6 formed in the plate 4 and the lug 18 carried by the pegs 7 have a substantially equal square cross-section.

Furthermore, as indicated in FIG. 4, the lug 18 carried by the pegs 7 is displaced with respect to the median line located between the arms 13, 14 of the pegs.

Figure 6:
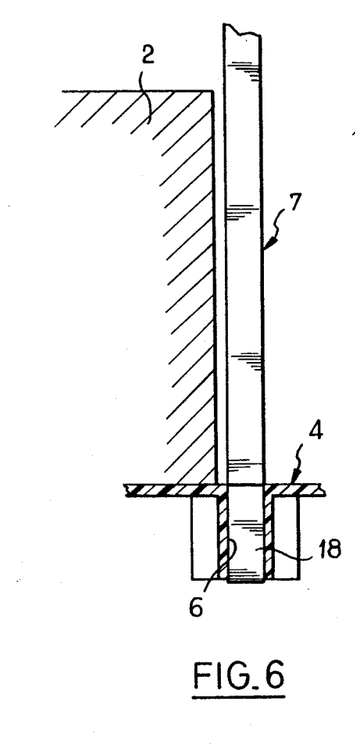
Figure 7:
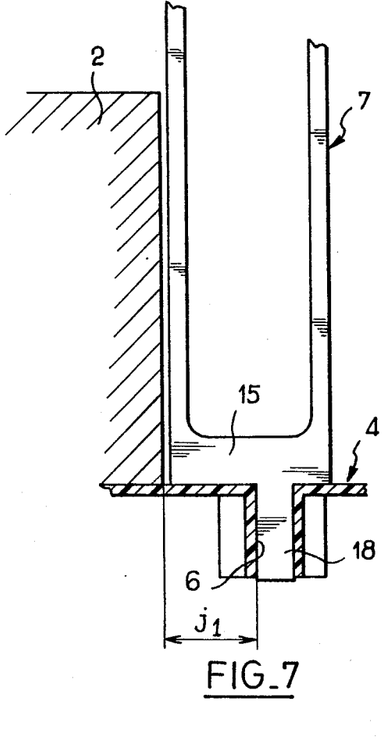
Figure 8:
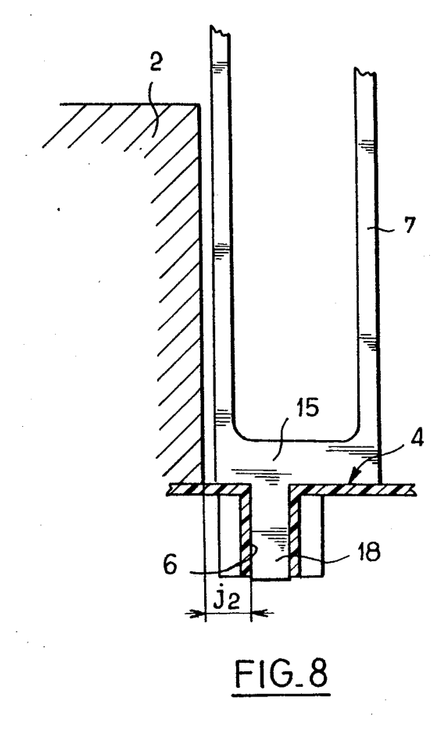

The technical advantages of this arrangement are shown in FIGS. 6 to 8.

As indicated in these FIGS. 6 to 8, the user can fix each peg 7 in a hole 6 of square cross-section in three different positions, depending on whether there exists between the object 2 to be clamped and the hole 6 a substantially zero clearance (case of FIG. 6), a large clearance j1 but smaller than the distance between two adjacent holes 6 (case of FIG. 7) or an intermediate clearance j2 (case of FIG. 8).

The user thus has at his disposal a convenient means for taking-up the clamping clearances which may exist between an object and the holes 6 for insertion of the pegs 7.

When an object is placed against a side wall of the trunk, it will usually be sufficient to surround this object with three pegs 7 in order to obtain effective clamping of said object in all directions. This clamping cannot be disturbed when the automobile is traveling in view of the fact that the sharp arrises 11b of the fins 12 which are oriented in four directions grip the moquette or rubber lining of the trunk floor and thus prevent any sliding of the plate 4.

At the same time, these fins 12 ensure perfect rigidity of the sleeves 11, thus preventing any excessive bending of the pegs 7 on each side of their vertical position under the action of the stresses exerted by the objects against these pegs 7 when the automobile is in motion.

The pegs which are not in use are readily stored within the recesses formed in the plate 4, with the result that these pegs do not obstruct the space available on the plate 4 for placing other objects and are immediately within reach.

Figure 10:
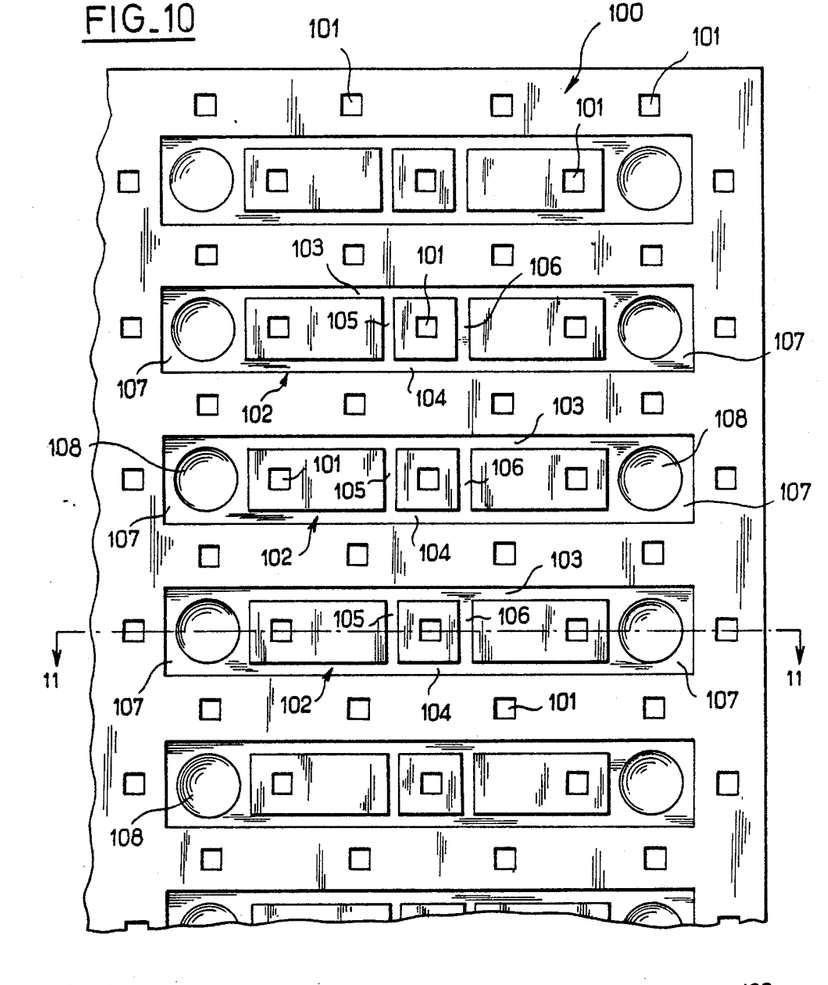
FIG. 10 is a partial top view of a plate in an alternative embodiment.
Figure 11:
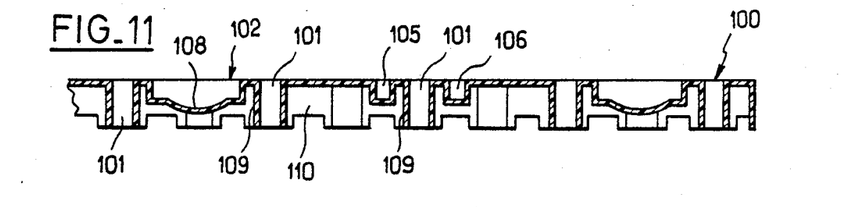
FIG. 11 is a sectional view along the plane XI—XI of FIG. 10.
Figure 12:
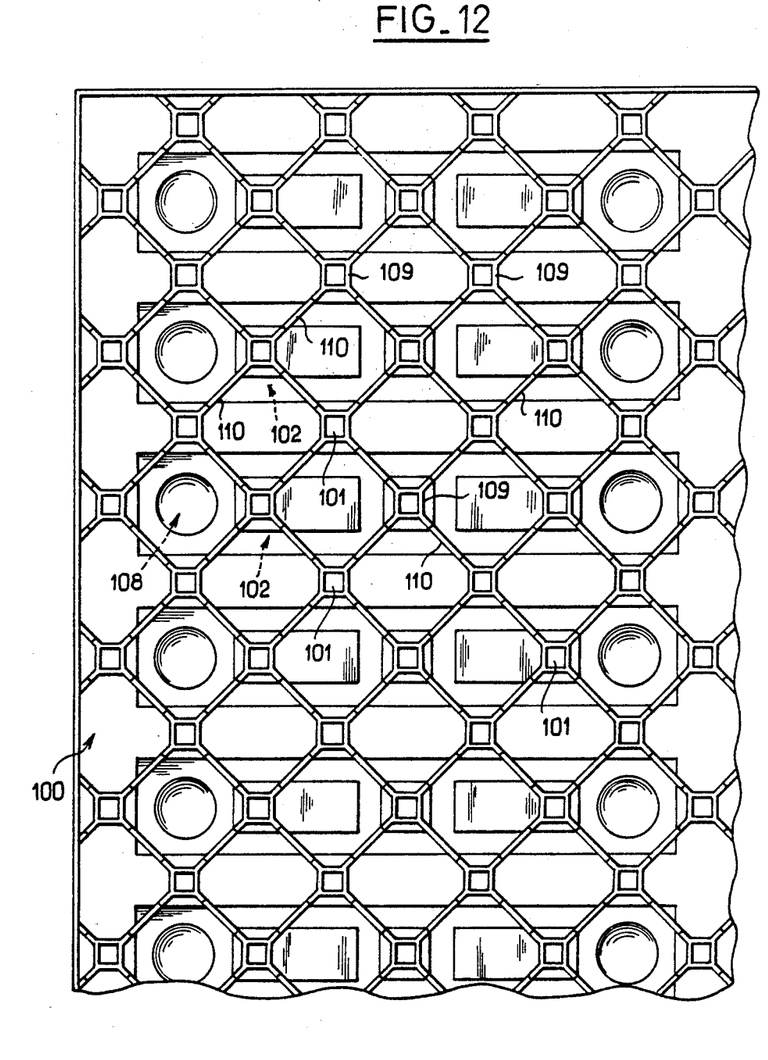
FIG. 12 is a bottom view of the plate.

In the embodiment illustrated in FIGS. 10 to 12, the device for stabilizing objects within the trunk of a vehicle comprises a plate 100 which is intended to be placed on the floor of the trunk. Said plate 100 is of molded plastic material and provided with holes 101 of square cross-section in uniformly spaced relation and a series of pegs not shown but similar to the pegs 7 described earlier which are intended to be inserted vertically in the holes 101 for clamping the objects.

The plate 100 has cavities 102 which are molded in the top surface of this latter (see FIG. 10) and so shaped as to receive the pegs which are not in use, in a flat or horizontal position.

In the embodiment shown in FIG. 10, the cavities 102 are parallel and aligned along the axis of certain (one out of two) rows of holes 101.

Each cavity 102 has two parallel grooves 103, 104 located on each side of a row of holes 101 for receiving the parallel arms of a peg 7 and grooves 105, 106 perpendicular to the two parallel grooves aforesaid for receiving a distance-piece of a peg.

It can also be seen in FIG. 10 that each cavity 102 is provided at its opposite ends with a recess 107 of square shape which is adapted to receive indifferently the upper portion of a peg or its lower portion comprising the lug which is intended to be introduced into a hole 101 of the plate 100.

The bottom of each recess 107 is provided as indicated earlier with a spherical surface 108 (see also FIG. 11) which makes it possible to facilitate removal of the pegs housed within the cavities 102.

As in the preceding embodiment, the holes 101 are formed in sleeves 109 (see FIGS. 11 and 12), these latter being connected together by means of diagonal ribs 110 (see FIG. 12) which ensure rigidity of the assembly. These ribs 110 make it possible in addition to obtain excellent adhesion of the bottom surface of the plate 100 to the surface on which it is intended to be placed.

The cavities 102 which are molded in the plate 100 serve to house in a flat position the pegs which are not used for stabilizing objects. In this position, the pegs do not obstruct the top of the plate, with the result that they do not interfere with the positioning of objects on said plate. Furthermore, by virtue of the fact that the pegs are perfectly set within the cavities 102, they are not liable to become dislodged from these latter when the vehicle is in motion.

As can readily be understood, the invention is not limited to the examples which have just been described and these latter can be given numerous modifications without departing from the scope of the invention.

Thus the holes 6 and the lugs 18 of the pegs could have a hexagonal cross-section or other polygonal shape, thereby enabling the user to increase the number of possible positions of each peg as a function of the distances between the object to be clamped and the holes of the plate.

As can readily be understood, the plate 4 can be constructed in different sizes adapted to those of automobile trunks.

Moreover, each plate 4 could be constituted by different plate elements assembled together by means of rapid attachment means.

Furthermore, the shape of the cavities 102 and their arrangement in the plate 100 can be different from those described provided that these cavities are capable of housing the pegs which are not in use. However, it is an advantage to ensure that the shape and dimensions of the cavities 102 and therefore those of the pegs make it possible to interpose these cavities between the holes 101 without impairing the uniformity of distribution and alignment of these holes.

Moreover, the number of cavities 102 can be limited to the number of pegs employed so as to ensure that these cavities occupy only a limited zone of the plate, the greater part of the surface of these latter being smooth.

The small rectangular surfaces delimited by the grooves 102, 103, 104, 105 and 106 are preferably located at the same level as the entire surface of the plate, as can be seen in FIG. 2.

As can readily be understood, the ribs 110 which connect the sleeves 109 could be dispensed with by giving the plate a sufficient thickness.

Furthermore, the plate 4, 100 could be constructed of wire welded netting and so arranged as to have holes for the insertion of pegs 7 and cavities for housing these latter in a flat position.

The pegs 7 could have a structure which is different from that described, provided that this latter makes it possible to house them in a horizontal position within cavities or recesses formed in the plate.

I claim:

1. Device for stabilizing objects within the trunk of a vehicle, in particular of an automobile, said device comprising a plate (4, 100) which is adapted to be placed on the floor of the trunk, said plate being provided with uniformly spaced holes (6, 101) and a series of members (7) which are adapted to be inserted vertically in the holes for stabilizing the objects, characterized in that said members are pegs (7) and that the plate is provided with cavities (9, 10, 102) molded in this latter and shaped so as to receive unused pegs in a flat position.

2. Device in accordance with claim 1, characterized in that the plate (4) is of molded plastic material.

3. Device in accordance with claim 1, characterized in that the cavities (102) are parallel and aligned along certain rows of holes (101).

4. Device in accordance with claim 1, characterized in that each cavity (102) has two parallel grooves (103, 104) located on each side of a row of holes (101) and adapted to receive parallel arms of a peg (7) and at least one groove (105, 106) which is perpendicular to said two parallel grooves and is adapted to receive a cross piece interconnecting said parallel arms of a peg.

5. Device in accordance with claim 4, characterized in that each cavity (102) is provided at its opposite ends with a recess (107) which is adapted to receive an end portion of a said peg.

6. Device in accordance with claim 1, characterized in that each hole (6) is formed in a sleeve (11) extending from that surface of the plate which receives the objects to be clamped.

7. Device in accordance with claim 6, characterized in that the length of the sleeves (11) is greater than the depth of the cavities (9, 10, 103 to 105) of the plate.

8. Device in accordance with claim 7, characterized in that the pegs (7) are shaped so as to be capable of fitting in a flat position within the cavities (9, 10) of the plate (4).

9. Device in accordance with claim 8, characterized in that each peg (7) has two parallel arms (13, 14) joined at their opposite ends by means of cross pieces (15, 16), the cross-section of said arms being substantially equal to that of the cavities (9, 10) of the plate and one (15) of the cross pieces is provided with a lug (18) which is adapted to be engaged in a hole (6) of the plate.

10. Device in accordance with claim 9, characterized in that the plate (4) has hollowed-out portions (19) bordered by two pairs of orthogonal said cavities (9, 10), the distance between two hollowed-out portions (19) being adapted to the length of the pegs (7).

11. Device in accordance with claim 9, characterized in that the holes (6) formed in the plate (4) and the lugs (18) carried by the pegs (7) have a substantially equal square cross-section.

12. Device in accordance with claim 9, characterized in that the lug (18) carried by the pegs (7) is displaced with respect to a median line located between the arms (13, 14) of the pegs.

* * * * *